US009344892B1

(12) United States Patent
Rodrigues et al.

(10) Patent No.: US 9,344,892 B1
(45) Date of Patent: May 17, 2016

(54) MOBILE DEVICE AUTHENTICATION AND CALL ROUTING USING DUAL-TONE MULTI-FREQUENCY SIGNALING

(71) Applicant: FMR LLC, Boston, MA (US)

(72) Inventors: Gregory A. Rodrigues, Wrentham, MA (US); Vickie Moosman Anderson, Milford, NH (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/000,772

(22) Filed: Jan. 19, 2016

(51) Int. Cl.
*H04W 40/00* (2009.01)
*H04W 12/06* (2009.01)
(Continued)

(52) U.S. Cl.
CPC ............ *H04W 12/06* (2013.01); *H04M 7/1295* (2013.01); *H04W 4/16* (2013.01); *H04W 40/00* (2013.01); *H04W 76/02* (2013.01); *H04W 84/16* (2013.01); *H04M 15/56* (2013.01); *H04M 2203/6054* (2013.01); *H04M 2207/18* (2013.01); *H04M 2207/20* (2013.01);
(Continued)

(58) Field of Classification Search
CPC ............ H04M 2207/20; H04M 15/56; H04M 2215/202; H04M 2207/18; H04M 3/42314; H04M 3/4234; H04M 7/006; H04M 2242/22; H04M 3/5183; H04M 3/523; H04M 3/5232; H04M 7/1225; H04M 3/42059; H04M 3/42102; H04M 3/42161; H04M 15/55; H04M 15/8016; H04M 2215/2046; H04W 76/02; H04W 40/00; H04W 84/042; H04W 76/022; H04W 12/06; H04W 36/0033; H04W 92/02; H04W 40/02; H04W 40/30; H04W 80/04; H04W 4/16; H04W 84/16; H04W 8/183; H04W 8/28; H04W 76/025; H04W 36/14; H04W 36/32; H04W 76/021

USPC ........... 455/445, 411, 404.1, 403, 405, 414.1, 455/415, 426.1, 428, 432.1, 435.1, 418, 455/426.2, 462; 370/352, 328, 466, 338, 370/254, 351, 235, 259; 379/142.05, 379/265.02, 221.01, 265.01, 265.11, 379/265.13, 266.02, 272, 273, 211.01; 709/238, 203, 219, 224, 245, 249
See application file for complete search history.

(56) References Cited

U.S. PATENT DOCUMENTS 5,003,595 A * 3/1991 Collins ................ G06F 21/313
8,301,117 B2 10/2012 Keast et al.
(Continued)

FOREIGN PATENT DOCUMENTS

WO 02/05078 A2 1/2002

*Primary Examiner* — Fred Casca
(74) *Attorney, Agent, or Firm* — Proskauer Rose LLP (57) ABSTRACT

Methods and apparatuses are described for mobile device authentication and call routing using dual-tone multi-frequency signaling. A server computing device receives a request to establish a call between a mobile device and a remote device, the request including context parameters and automatic number identification data. The server retrieves a first phone number and a dial delay value based upon the context parameters, generates a security token and a request token, and stores the security token, the request token, the context parameters, and the ANI data in a database record. The mobile device dials the first phone number to establish a connection with a telephony application. The mobile device generates DTMF tones based upon the request token and transmits the DTMF tones to the telephony application. The telephony application validates the request token and requests a second phone number to connect the mobile device and the remote device.

26 Claims, 3 Drawing Sheets

(51) Int. Cl.
*H04M 7/12* (2006.01)
*H04W 76/02* (2009.01)
*H04W 4/16* (2009.01)
*H04W 84/16* (2009.01)
*H04M 15/00* (2006.01)
*H04W 84/04* (2009.01)
*H04W 36/00* (2009.01)
*H04W 92/02* (2009.01)
*H04W 40/02* (2009.01)
*H04W 40/30* (2009.01)
*H04W 80/04* (2009.01)
*H04W 8/18* (2009.01)

(52) U.S. Cl.
CPC .......... *H04W 8/183* (2013.01); *H04W 36/0033* (2013.01); *H04W 40/02* (2013.01); *H04W 40/30* (2013.01); *H04W 76/022* (2013.01); *H04W 80/04* (2013.01); *H04W 84/042* (2013.01); *H04W 92/02* (2013.01)

(56) References Cited

U.S. PATENT DOCUMENTS

| | | |
|---|---|---|
| 8,385,888 B2 | 2/2013 | Labrador et al. |
| 2014/0179278 A1 | 6/2014 | Kramarenko et al. |
| 2015/0105046 A1 | 4/2015 | Grosby |

* cited by examiner

MOBILE DEVICE AUTHENTICATION AND CALL ROUTING USING DUAL-TONE MULTI-FREQUENCY SIGNALING

TECHNICAL FIELD

This application relates generally to methods and apparatuses, including computer program products, for mobile device authentication and call routing using dual-tone multi-frequency (DTMF) signaling.

BACKGROUND

Modern mobile devices such as smartphones provide a diverse set of functionality, including the ability to navigate and access content on the Internet (e.g., via a native application/browser) and the ability to initiate telephone calls over cellular and public telephone systems. In some circumstances, a user of a mobile device may utilize a native application or browser session to authenticate the device and/or himself in order to access a secure resource—such as a secured website for executing transactions or retrieving information. While using the secured website, the user may encounter difficulties or have questions relating to specific secure transactions and information and the user may wish to quickly initiate a telephone call to a representative that can assist, from within the native application or browser session. Also, it is desirable to capture certain context information relating to the native application (e.g., what web page is the application on when the call is initiated, what function is the user trying to perform, and the like) in order to route the telephone call to a representative that is best equipped to handle the situation.

It is also important to authenticate the user and the mobile device before completing the telephone call so that the security of any information provided on the telephone call is preserved. However, public telephone networks (e.g., the public-switched telephone network (PSTN)) typically do not allow user credentials to be passed over the network—which complicates the process to provide a seamless and secure telephone call in the manner noted above.

SUMMARY

The invention, in one aspect, features a computerized method for mobile device authentication and call routing using dual-tone multi-frequency (DTMF) signaling. A first server computing device receives, from a native application on a mobile device, a request to establish a voice call between the mobile device and a remote device. The request includes context parameters associated with the native application, automatic number identification (ANI) data of the mobile device, and biometric parameters associated with a user of the mobile device. The first server computing device retrieves a first phone number and a dial delay value based upon the context parameters. The first server computing device generates a security token for the mobile device and a request token for the request, and stores the security token, the request token, the context parameters, and the ANI data in a database record. The first server computing device transmits the request token, the dial delay value, and the first phone number to the mobile device. The mobile device dials the first phone number using the dial delay value to establish a connection with a telephony application on a second server computing device. The mobile device generates DTMF tones based upon the request token and transmits the DTMF tones to the telephony application, the telephony application recreating the request token in local memory using the DTMF tones. The telephony application validates the request token with the first server computing device, where validation of the request token includes checking a timestamp of the request token, matching the ANI data, and validating the biometric parameters. The telephony application requests a second phone number from the first server computing device. The first server computing device determines the second phone number based upon the context parameters as retrieved from the database record and transmits the second phone number to the telephony application. The telephony application establishes a voice call between the mobile device and the remote device by dialing the second telephone number to connect the mobile device and the remote device.

The invention, in another aspect, features a system for mobile device authentication and call routing using dual-tone multi-frequency (DTMF) signaling. The system comprises a first server computing device, a second server computing device executing a telephony application, a mobile device executing a native application, and a remote device. The first server computing device is configured to receive, from the native application, a request to establish a voice call between the mobile device and the remote device, the request including context parameters associated with the native application, automatic number identification (ANI) data of the mobile device, and biometric parameters associated with a user of the mobile device. The first server computing device is configured to retrieve a first phone number and a dial delay value based upon the context parameters. The first server computing device is configured to generate a security token for the mobile device and a request token for the request, and store the security token, the request token, the context parameters, and the ANI data in a database record. The first server computing device is configured to transmit the request token, the dial delay value, and the first phone number to the mobile device. The mobile device is configured to dial the first phone number using the dial delay value to establish a connection with the telephony application, generate DTMF tones based upon the request token and transmit the DTMF tones to the telephony application. The telephony application is configured to recreate the request token in local memory using the DTMF tones. The telephony application is configured to validate the request token with the first server computing device, where validation of the request token includes checking a timestamp of the request token, matching the ANI data, and validating the biometric parameters. The telephony application is configured to request a second phone number from the first server computing device. The first computing device is configured to determine the second phone number based upon the context parameters as retrieved from the database record and transmitting the second phone number to the telephony application. The telephony application is configured to establish a voice call between the mobile device and the remote device by dialing the second telephone number to connect the mobile device and the remote device.

Any of the above aspects can include one or more of the following features. In some embodiments, the context parameters include a call flow indicator and one or more page identifiers. In some embodiments, the page identifiers correspond to a web page being presented on the mobile device. In some embodiments, the biometric parameters include a fingerprint, a facial image, a retina scan, and a voice sample. In some embodiments, the request token is an alphanumeric string and each DTMF tone corresponds to one character in the alphanumeric string.

In some embodiments, the telephony application authorizes the mobile device to proceed with a voice call upon receiving the request token. In some embodiments, the request token uniquely identifies the database record. In some embodiments, the request token is generated by encrypting a database record number of the database record using the security token.

In some embodiments, checking a timestamp of the request token comprises determining whether a database record exists that corresponds to the request token, comparing the timestamp of the request token with a current time timestamp, and marking the database record as inactive if the timestamp of the request token is within a predetermined amount of time of the current time timestamp. In some embodiments, matching the ANI data comprises receiving, from the telephony application, ANI data associated with the mobile device, and comparing the ANI data received from the telephony application with the ANI data stored in the database record. In some embodiments, validating the biometric parameters comprises capturing, by the telephony application, biometric parameters for a user of the mobile device, transmitting, by the telephony application, the captured biometric parameters to the first computing device, and comparing, by the first computing device, the captured biometric parameters with the biometric parameters stored in the database record.

In some embodiments, dialing the first phone number using the dial delay value comprises opening, by the mobile device, a telephone line, and waiting, by the mobile device, a period of time corresponding to the dial delay value before dialing the first phone number. In some embodiments, the first computing device generates a request key upon validation of the request token and transmits the request key to the telephony application. The telephony application acknowledges the request key and the first computing device retrieves the context parameters using the request key.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
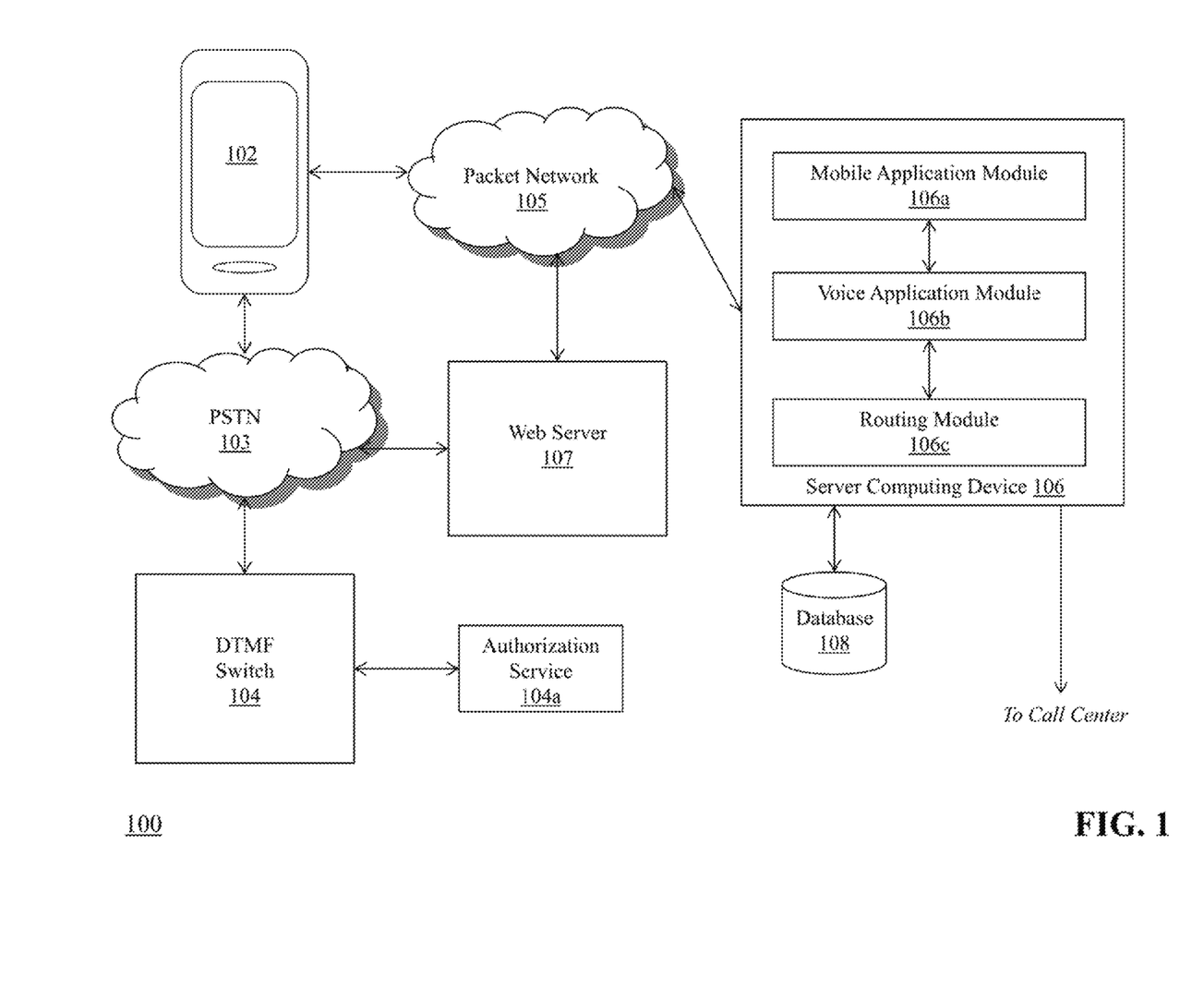
FIG. 1 is a block diagram of a system for mobile device authentication and call routing using dual-tone multi-frequency (DTMF) signaling.

FIG. 1 is a block diagram of a system 100 for mobile device authentication and call routing using DTMF signaling. The system 100 includes a mobile computing device 102, a public-switched telephone network (PSTN) 103, a DTMF switch 104 coupled to an authorization service 104a, a packet-based communication network 105, a server computing device 106 with a mobile application module 106a, a voice application module 106b, and a routing module 106c, a web server 107, and a database 108.

The mobile computing device 102 uses software and circuitry to communicate with the DTMF switch 104 via the PSTN 103 (e.g., using an embedded cellular antenna to connect to the PSTN), and also uses software and circuitry to communicate with the server computing device 106 via the packet-based communication network 105 (e.g., using an app installed on the device to connect to the Internet via an embedded wi-fi antenna). Example mobile computing devices 102 can include, but are not limited to, a smart phone (e.g., Apple iPhone®, Windows®, and/or Android™-based device) or other similar mobile communications devices.

The DTMF switch 104 is a computing device that is coupled to the PSTN 103 and receives incoming telephone calls from mobile device 102 and connecting the mobile device 102 to the server computing device 106 for the purpose of routing the telephone calls to, e.g., a desired destination, as will be explained in greater detail below. The DTMF switch 104 also communicates with other devices to perform functions such as authorization and authentication of the mobile device 102 and transferring the call originated at the mobile device to the desired destination (e.g., a call center). The DTMF switch 104 is coupled to the server computing device 106 via web server 107 which acts as a communications interface between the PSTN 103 on which the DTMF switch 104 resides and the packet-based communication network 105, on which the server computing device 106 resides. The DTMF switch 104 is also coupled to an authorization service 104a which authorizes the mobile device 102 before connecting the mobile device 102 to the server computing device 106 for the purpose of routing a telephone call. In some embodiments, the authorization service 104a is provided by the operator of the DTMF switch 104. The authorization service 104a may be hosted on the same hardware as the DTMF switch 104 or on a different hardware device.

The packet-based communication network 105 enables components of the system 100 to communicate with each other using a packet-based protocol (e.g., IP). The network 105 may be a local network, such as a LAN, or a wide area network, such as the Internet. In some embodiments, the network 104 is comprised of several discrete networks and/or sub-networks (including related routing, load balancing, and traffic metering hardware).

The server computing device 106 is a combination of hardware and software modules that includes specialized hardware and/or software modules that execute on a processor and interact with memory modules of the server computing device 106, to receive data from other components of the system 100, transmit data to other components of the system 100, and perform functions for mobile device authentication using dual-tone multi-frequency (DTMF) signaling as described herein. The server computing device 106 includes a mobile application module 106a, a voice application module 106b, and a routing module 106c that execute on the processor of the server computing device 106. In some embodiments, the modules 106a-106c are specialized sets of computer software instructions programmed onto one or more dedicated processors in the server computing device 106 and can include specifically-designated memory locations and/or registers for executing the specialized computer software instructions. Although the modules 106a-106c are shown in FIG. 1 as executing within the same server computing device 106, in some embodiments the functionality of the modules 106a-106c can be distributed among a plurality of server computing devices. It should be appreciated that any number of computing devices, arranged in a variety of architectures, resources, and configurations (e.g., cluster computing, virtual computing, cloud computing) can be used without departing from the scope of the invention. The exemplary functionality of the modules 106a-106c is described in detail below.

The mobile application module 106a communicates with the mobile device 102 via the packet-based network 105 and provides functionality associated with one or more applications (in some contexts, also called native applications) installed on and executing on the mobile device 102. For example, a user may launch or access a mobile application on the mobile device (e.g., a banking or shopping application) that establishes a communication session with the mobile application module 106a and requests or utilizes resources provided by the module 106a (e.g., account information, product information, and the like). The mobile application module 106a also communicates with the voice application module 106b to carry out functions associated with mobile device authentication using dual-tone multi-frequency (DTMF) signaling as described herein. Further description of the functionality of the mobile application module 106a will be provided with respect to FIGS. 2A and 2B.

The voice application module 106b communicates with the DTMF switch 104 via the web server 107, and communicates with the routing module 106c and the database 108, to carry out functionality for mobile device authentication using dual-tone multi-frequency (DTMF) signaling as described herein. Further description of the functionality of the voice application module 106b will be provided with respect to FIGS. 2A and 2B.

The routing module 106c communicates with the voice application module 106b to determine a desired routing destination for an inbound telephone call that originated at the mobile device 102. For example, the routing module 106c can receive a request from the voice application module 106b to provide a phone number to which the telephone call is directed as a desired destination. Further description of the functionality of the routing application module 106c will be provided with respect to FIGS. 2A and 2B.

The web server 107 is a combination of hardware and software modules that includes specialized hardware and/or software modules that execute on a processor and interact with memory modules of the web server 107, to receive data from other components of the system 100, transmit data to other components of the system 100, and perform certain functions for mobile device authentication using dual-tone multi-frequency (DTMF) signaling as described herein. As mentioned above, the web server 107 acts as a communications interface (e.g., a bridge) between the PSTN 103 on which the DTMF switch 104 resides and the packet-based communication network 105, on which the server computing device 106 resides. For example, the web server 107 translates communications (e.g., signaling and data) between the DTMF switch 104 and the server computing device 106. Further description of the functionality of the web server 107 will be provided with respect to FIGS. 2A and 2B.

The database 108 is a computing device (or in some embodiments, a set of computing devices) coupled to the server computing device 106 and is configured to receive, generate, and store specific segments of data relating to the process of mobile device authentication using DTMF signaling as described herein. In some embodiments, all or a portion of the database 108 can be integrated with the server computing device 106 or be located on a separate computing device or devices. The database 108 can comprise one or more databases configured to store portions of data used by the other components of the system 100, as will be described in greater detail below. An exemplary database 108 is MySQL™ available from Oracle Corp. of Redwood City, Calif.

Figure 2A:
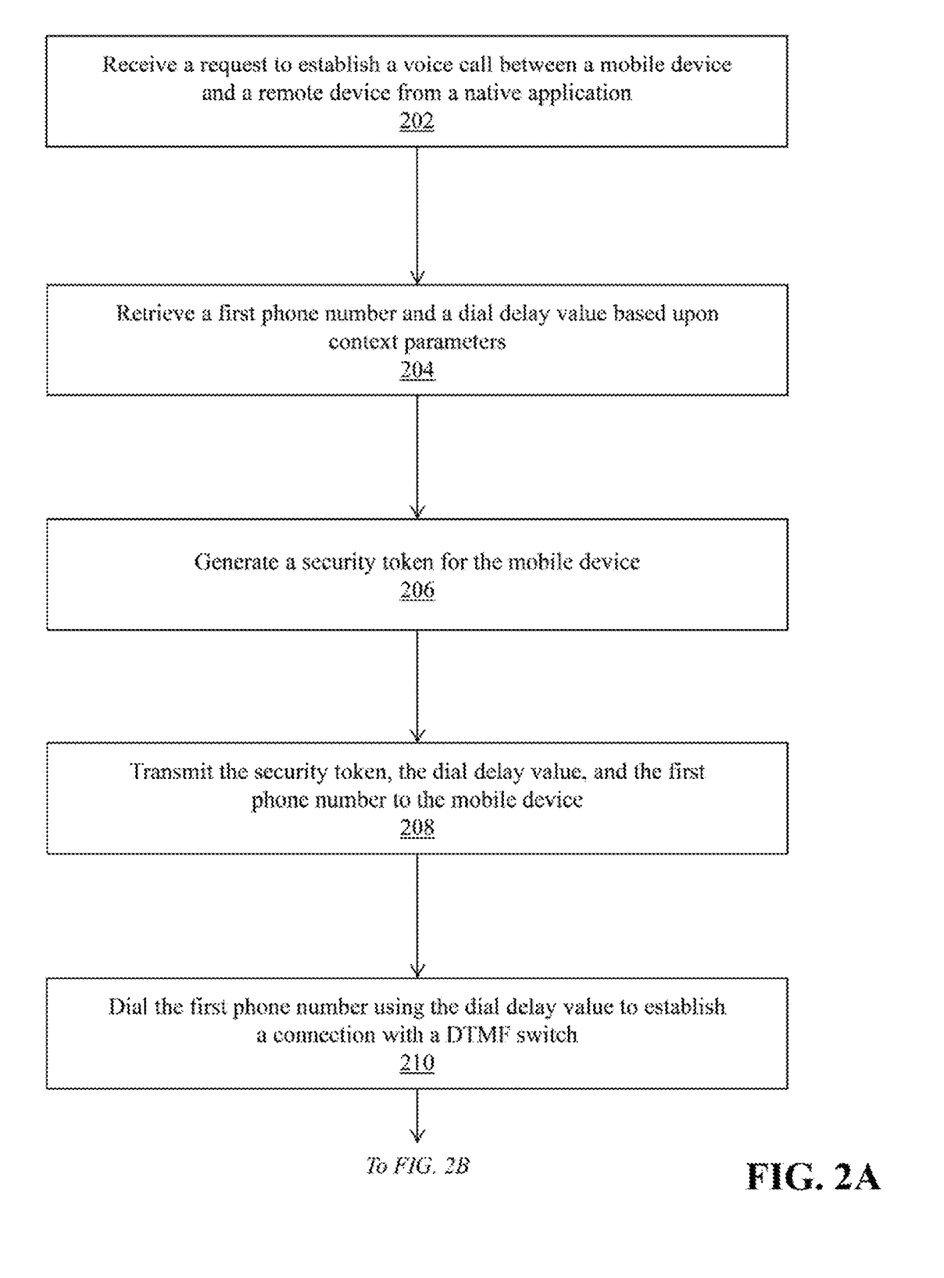
FIGS. 2A and 2B are a flow diagram of a method for mobile device authentication and call routing using DTMF signaling.
Figure 2B:
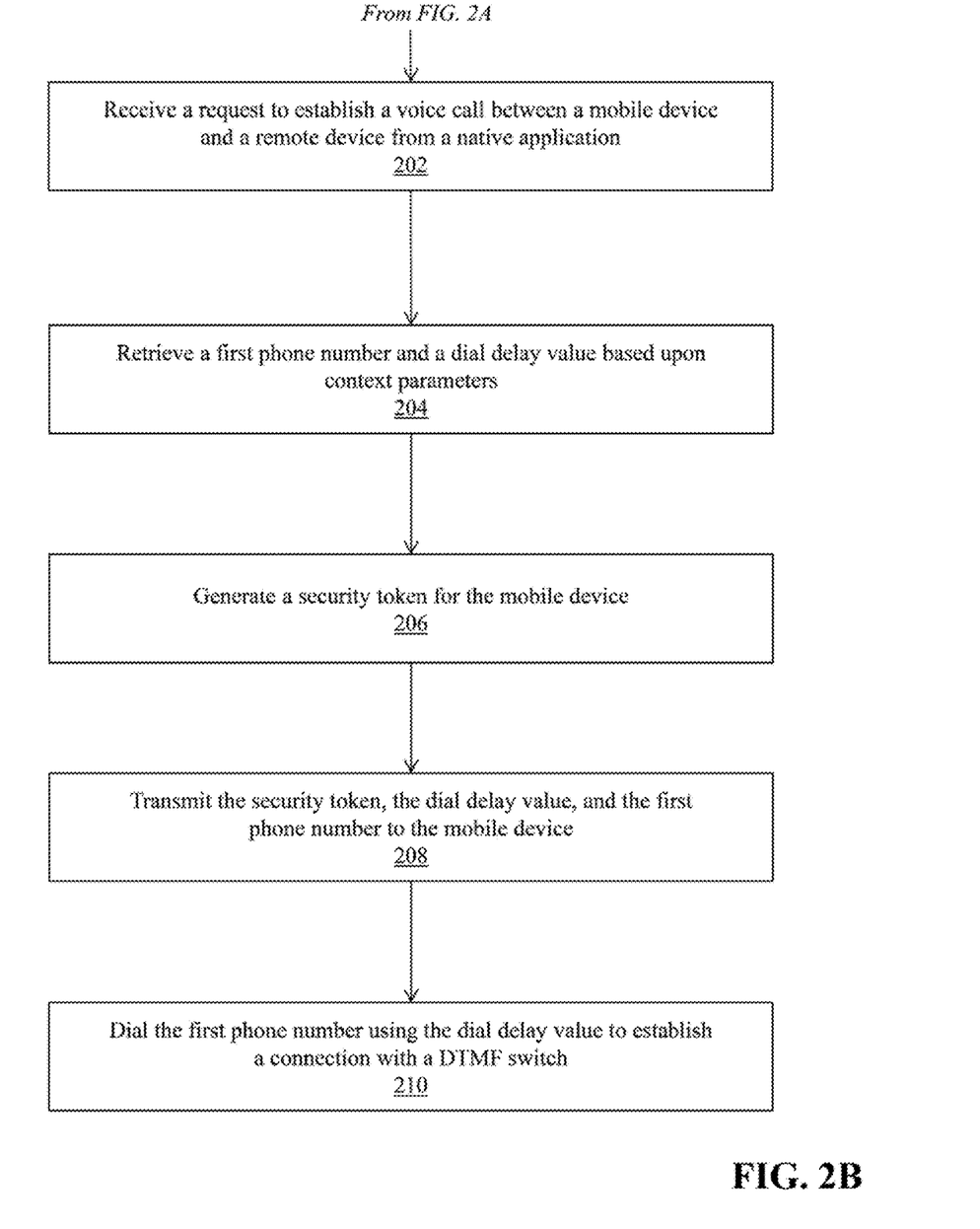

FIGS. 2A and 2B comprise a flow diagram of a method for mobile device authentication and call routing using DTMF signaling, using the system 100 of FIG. 1. The mobile application module 106a receives (202), from a native application on the mobile device 102, a request to establish a voice call between the mobile device 102 and a remote device (e.g., a call center). The request includes context parameters associated with the native application, automatic number identification (ANI) data of the mobile device 102, and biometric parameters (e.g., fingerprint, voice capture, retina scan) associated with a user of the mobile device 102. The mobile application module 106a transmits the request to the voice application module 106b, and the voice application module 106b retrieves (204) a first phone number and a dial delay value based upon the context parameters. The voice application module 106b generates (206) a security token for the mobile device and a request identifier for the request, and stores the security token, the request identifier, the context parameters, and the ANI data in the database 108.

The mobile application module 106a transmits (208) the security token, the dial delay value, and the first phone number to the mobile device 102. The mobile device 102 dials (210) the first phone number using the dial delay value to establish a connection with a telephony application on the DTMF switch 104. The mobile device 102 generates (212) DTMF tones based upon the security token and the device 102 transmits the DTMF tones to the telephony application on the DTMF switch 104. The telephony application on the DTMF switch 104 validates (212) the security token with the voice application module 106b on the server computing device 106 (via the web server 107) and the module 106b retrieves the request identifier from the database 108. In some embodiments, validation of the security token includes checking a timestamp of the security token, matching the ANI data, and validating the biometric parameters.

The telephony application on the DTMF switch 104 requests (214) a second phone number from the voice application module 106b. The voice application module 106b determines (216) the second phone number based upon the context parameters as retrieved from the database 108 using the request identifier. In some embodiments, the voice application module 106b requests the second phone number from the routing module 106c. The voice application module 106b transmits the second phone number to the telephony application on the DTMF switch 104. The telephony application on the DTMF switch 104 establishes (218) a voice call between the mobile device 102 and a remote device (e.g., a computing application at a call center) using the second telephone number.

The following is a detailed description of the method set forth above with respect to FIGS. 2A and 2B, using the system 100 of FIG. 1:

A user of mobile device 102 launches a native application installed and executing on the mobile device 102. The native application can be any type of software application that includes connectivity to a remote computing resource (e.g., the mobile application module 106a on server computing device 106) for retrieving information to be presented on the mobile device, for conducting communications and/or transactions between the mobile device 102 and mobile application module 106a, and the like. It should be appreciated that the native application, in some embodiments, is a web browser installed on the mobile device 102 and used to navigate to a website (e.g., via URL).

Certain examples of the native application include but are not limited to applications that provide a service to a user of the mobile device whereby the user authenticates to the remote computing resource in order to perform transactions or gain access to information (e.g., a mobile banking application, an e-commerce application) and where the user may request initiation of a telephone call via the mobile device to receive additional information regarding the functionality associated with the native application (e.g., discuss an order with a sales agent, confirm an account transaction with a customer service representative, and so forth).

After launching the native application on the mobile device 102, the user provides authentication credentials (e.g., username, password, PIN, biometric data) to the native application which are authenticated by the mobile application module 106*a* to enable access to certain functionality of the application and/or information from the mobile application module 106*a*. During the course of the user's interaction with the native application, he or she may wish to speak with someone via a phone call as explained above. In some embodiments, the native application includes functionality that, when activated, initiates the workflow described herein to establish and route a telephone call from the mobile device 102 to the appropriate destination. In one example, the application can include a button or link to initiate the call (e.g., "Speak with Rep").

When this functionality is activated at the mobile device 102, the mobile device transmits a request to the mobile application module 106*a* to establish a voice call between the mobile device and a remote device (e.g., a call center terminal). In some embodiments, the request includes a call flow indicator, one or more page identifiers, and other context information. The call flow indicator is an identifier (e.g., a string of text, an alphanumeric code, and the like) that indicates a context of the native application at the time the user activated the call initiation functionality. For example, if the user was in the midst of reviewing his shopping cart in an e-commerce application before placing an order and he had a question about a particular item when he activated the call request, the call flow indicator can be a data element corresponding to that specific context (e.g., "ShoppingCartReview") and so forth. The page identifiers relate to the navigational context of the native application at the time the user activated the call initiation functionality. For example, a page identifier can be all or a portion of a URL or other type of code or metadata that specifically identifies the webpage or other display at which the native application was directed when the call initiation takes place. It should be appreciated that the request can include other context information in order to capture a state of the native application and/or the mobile device at the time the call initiation occurred (e.g., device settings, network connectivity settings, carrier settings, geolocation information, biometric information of the user, data stored in the memory of the device, and so forth).

Upon receiving the request, the mobile application module 106*a* transmits the request to the voice application module 106*b*. In one embodiment, the mobile application module 106*a* transmits the request to the voice application module 106*b* using security protocols and techniques, such as WS-Security/SAML. As part of the secure transmission, the mobile application module 106*a* generates a SAML token corresponding to the request and transmits the SAML token to the voice application module 106*b*.

In some embodiments, as part of the request transmission, the mobile application module 106*a* performs automatic number identification (ANI) processing to determine a telephone number and line type associated with the mobile device 102. It should be appreciated that other components of the system 100 can perform the ANI processing to obtain the requisite information. Also, in some embodiments, the mobile application module 106*a* receives and/or captures biometric data associated with the user of the mobile device 102.

Using the call flow indicator, the voice application module 106*b* retrieves a static phone number and a dial delay value from the database 108. The static phone number corresponds to the DTMF switch 104. The dial delay value denotes a period of time between the point at which the mobile device 102 opens a line to connect to the DTMF switch 104 and the point at which the mobile device 102 begins to dial the static phone number to connect. Although there is one DTMF switch 104 depicted in FIG. 1, it should be appreciated that the system 100 can include a plurality of DTMF switches that relate to certain call flow indicators and/or native applications.

The voice application module 106*b* also stores the information received in the call initiation request into the database 108, including the call flow indicator, page identifiers, other context information, and timestamp of the request. In one embodiment, the information is stored in a unique row/record in the database 108 so that it is specifically located during later processing. The voice application module 106*b* further generates a request token that corresponds to the request information that is stored in the database record. In one embodiment, the request token is a unique numeric identifier that corresponds to the database record. The request token can be generated by encrypting the specific database row number and/or record that contains the request information into a key, hash or other string. The request token is also stored in the database 108. The voice application module 106*b* then returns the static phone number, the request token, and the dial delay value to the mobile application module 106*a*, which passes these three elements to the mobile device 102.

The telephone functionality/application of the mobile device 102 receives the static phone number, the request token, and the dial delay value, and initiates a call to the DTMF switch 104 by opening a telephone line (e.g., via cellular carrier to connect to the PSTN 103) and dialing the static phone number. In some embodiments, the mobile device 102 utilizes the dial delay value to wait a predetermined amount of time (e.g., two seconds) to ensure that a dial tone is available before beginning to dial the static phone number. The DTMF switch 104 receives the incoming call from the mobile device 102 and establishes a connection.

Once the mobile device 102 is connected to the DTMF switch 104, the DTMF switch listens for the request token to be transmitted from the mobile device. In one embodiment, the mobile device 102 generates a series of DTMF tones that correspond to the alphanumeric characters that comprise the request token and sends the tones out-of-band to the DTMF switch 104. It should be appreciated that other techniques for transmitting the request token to the DTMF switch could be used without departing from the scope of the invention described herein. The DTMF switch 104 stores the request token (e.g., in local memory).

In some embodiments, the DTMF switch 104 transmits a connection request to an authorization service 104*a* coupled to the DTMF switch. The connection request indicates that the mobile device 102 is attempting to connect to a desired destination (e.g., a call center) via a telephone call routed through the DTMF switch 104. The connection request can include certain information associated with the mobile device 102. The authorization service 104*a* analyzes the connection request to determine whether the mobile device 102 is authorized to connect via voice call to the other components of the system 100, such as the server computing device 106 and the web server 107. If the mobile device is authorized, the authorization server 104*a* returns a confirmation to the DTMF switch 104.

The DTMF switch 104 then connects to the web server 107 in order to validate the request token and determine how to route the voice call from the mobile device 102. As mentioned above, the web server 107 acts as a communications interface between the DTMF switch 104 and the server computing device 106 and can translate communications between the two components 104, 106 including translating messages between different protocols, such as SS7 and IP. The DTMF switch 104 passes the request token to the voice application module 106b and asks the voice application module 106b to confirm that the request token exists and is valid. The DTMF switch 104 can pass other information to the voice application module 106b, such as the ANI data, biometric data and so forth. In some embodiments, the DTMF switch 104 captures biometric data from the user of the mobile device 102 (e.g., a spoken phrase) at this point and transmits the biometric data to the voice application module 106b.

To validate the request token, the voice application module 106b accesses the database 108. The voice application module 106b determines whether (i) a database record for the request token exists and (ii) whether the record was created/generated less than, e.g., a few seconds ago—meaning that the initiation of the voice call (by activating functionality in the mobile device's native application) occurred shortly before the token validation request. As such, it can be confirmed that the call initiation is timely and not related to an old request or to a user that no longer needs to connect via voice call to, e.g., a call center.

If the database record for the request token meets the above elements, then the voice application module 106b marks the database record as used (meaning the request token is ineligible to be used for a future call request). In some embodiments, the voice application module 106b also compares the ANI data received from the DTMF switch 104 with ANI data stored in the database record and can look up the ANI data in an external source (e.g., an ANI database) to confirm that the mobile device 102 connecting via voice call is the same mobile device that requested the call from the native application. Also, as mentioned above, the voice application module 106b can compare the biometric data captured by the DTMF switch 104 to biometric data stored in the database record to confirm that the person using the mobile device 102 to connect via voice call is the same person that requested the call from the native application.

Once the voice application module 106b validates the request token, the module 106b generates a request key and stores the request key in the database record. The request key is an identifier that confirms validation of the request token to the DTMF switch 104 and enables the voice application module 106b to subsequently build routing information for the voice call, as explained below. The voice application module 106b transmits the request key to the DTMF switch 104 via the web server 107.

The DTMF switch 104 acknowledges the request key and returns the request key to the voice application module 106b along with a request for a voice call transfer number. Once the voice application module 106b receives the transfer number request, the module obtains the call flow indicator, page identifiers, and other relevant context information from the database 108 using the request key. The voice application module 106b then builds call routing information by transmitting the call flow indicator, page identifiers, and context information to the routing module 106c.

The routing module 106c analyzes the received call flow indicator, page identifiers, and context information to determine a specific destination (e.g., call center or customer representative group within a call center) for the voice call. As can be appreciated, a call center can be adapted to handle a variety of different customer service issues with specific representatives being trained only for certain issues. Therefore, the routing module 106c is configured to determine a specific transfer phone number for a call center/rep group that is best equipped to handle the specific issue designated by the call flow indicator, page identifiers, and context information.

For example, if the call flow indicator indicates that the user of the mobile device 102 was in the midst of reviewing his shopping cart in an e-commerce application before placing an order and he had a question about a particular item when he activated the call request, the routing module 106c determines (e.g., by performing a database look up) that the proper customer representative group to handle the call is an e-commerce group. In another example, if the call flow indicator indicates that the user of the mobile device 102 was accessing his online bank accounts and wanted to initiate a funds transfer over the phone, the routing module 106c determines that the proper customer representative group to handle the call is an existing customer funds transfer group.

The routing module 106c returns the transfer phone number to the voice application module 106b which then passes the transfer phone number to the DTMF switch 104 via the web server 107. The DTMF switch 104 routes the voice call to the destination using the transfer phone number and connects the user of the mobile device 102 to a resource that can assist with his questions or issues.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOW), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for mobile device authentication and call routing using dual-tone multi-frequency (DTMF) signaling, the method comprising:

receiving, by a first server computing device from a native application on a mobile device, a request to establish a voice call between the mobile device and a remote device, the request including context parameters associated with the native application, automatic number identification (ANI) data of the mobile device, and biometric parameters associated with a user of the mobile device;

retrieving, by the first server computing device, a first phone number and a dial delay value based upon the context parameters;

generating, by the first server computing device, a security token for the mobile device and a request token for the request, and storing the security token, the request token, the context parameters, and the ANI data in a database record;

transmitting, by the first server computing device, the request token, the dial delay value, and the first phone number to the mobile device;

dialing, by the mobile device, the first phone number using the dial delay value to establish a connection with a telephony application on a second server computing device;

generating, by the mobile device, DTMF tones based upon the request token and transmitting the DTMF tones to the telephony application, the telephony application recreating the request token in local memory using the DTMF tones;

validating, by the telephony application, the request token with the first server computing device, wherein validation of the request token includes checking a timestamp of the request token, matching the ANI data, and validating the biometric parameters;

requesting, by the telephony application, a second phone number from the first server computing device;

determining, by the first server computing device, the second phone number based upon the context parameters as retrieved from the database record and transmitting the second phone number to the telephony application; and establishing, by the telephony application, a voice call between the mobile device and the remote device by dialing the second telephone number to connect the mobile device and the remote device.

2. The method of claim 1, wherein the context parameters include a call flow indicator and one or more page identifiers.

3. The method of claim 2, wherein the page identifiers correspond to a web page being presented on the mobile device.

4. The method of claim 1, wherein the biometric parameters include a fingerprint, a facial image, a retina scan, and a voice sample.

5. The method of claim 1, wherein the request token is an alphanumeric string and each DTMF tone corresponds to one character in the alphanumeric string.

6. The method of claim 1, further comprising authorizing, by the telephony application, the mobile device to proceed with a voice call upon receiving the request token.

7. The method of claim 1, wherein the request token uniquely identifies the database record.

8. The method of claim 1, wherein the request token is generated by encrypting a database record number of the database record using the security token.

9. The method of claim 1, wherein checking a timestamp of the request token comprises determining, by the first computing device, whether a database record exists that corresponds to the request token;

comparing, by the first computing device, the timestamp of the request token with a current time timestamp; and marking, by the first computing device, the database record as inactive if the timestamp of the request token is within a predetermined amount of time of the current time timestamp.

10. The method of claim 1, wherein matching the ANI data comprises receiving, by the first computing device from the telephony application, ANI data associated with the mobile device; and comparing, by the first computing device, the ANI data received from the telephony application with the ANI data stored in the database record.

11. The method of claim 1, wherein validating the biometric parameters comprises capturing, by the telephony application, biometric parameters for a user of the mobile device;

transmitting, by the telephony application, the captured biometric parameters to the first computing device; and comparing, by the first computing device, the captured biometric parameters with the biometric parameters stored in the database record.

12. The method of claim 1, wherein dialing the first phone number using the dial delay value comprises opening, by the mobile device, a telephone line; and waiting, by the mobile device, a period of time corresponding to the dial delay value before dialing the first phone number.

13. The method of claim 1, further comprising generating, by the first computing device, a request key upon validation of the request token;

transmitting, by the first computing device, the request key to the telephony application;

acknowledging, by the telephony application, the request key; and retrieving, by the first computing device, the context parameters using the request key.

14. A system for mobile device authentication and call routing using dual-tone multi-frequency (DTMF) signaling, the system comprising:

a first server computing device;

a second server computing device executing a telephony application;

a mobile device executing a native application; and a remote device, the first server computing device configured to receive, from the native application, a request to establish a voice call between the mobile device and the remote device, the request including context parameters associated with the native application, automatic number identification (ANI) data of the mobile device, and biometric parameters associated with a user of the mobile device;

retrieve a first phone number and a dial delay value based upon the context parameters;

generate a security token for the mobile device and a request token for the request, and store the security token, the request token, the context parameters, and the ANI data in a database record;

transmit the request token, the dial delay value, and the first phone number to the mobile device;

the mobile device configured to dial the first phone number using the dial delay value to establish a connection with the telephony application;

generate DTMF tones based upon the request token and transmit the DTMF tones to the telephony application;

the telephony application configured to recreate the request token in local memory using the DTMF tones;

validate the request token with the first server computing device, wherein validation of the request token includes checking a timestamp of the request token, matching the ANI data, and validating the biometric parameters;

request a second phone number from the first server computing device;

wherein the first server computing device determines the second phone number based upon the context parameters as retrieved from the database record and transmits the second phone number to the telephony application, and wherein the telephony application establishes a voice call between the mobile device and the remote device by dialing the second telephone number to connect the mobile device and the remote device.

15. The system of claim 14, wherein the context parameters include a call flow indicator and one or more page identifiers.

16. The system of claim 15, wherein the page identifiers correspond to a web page being presented on the mobile device.

17. The system of claim 14, wherein the biometric parameters include a fingerprint, a facial image, a retina scan, and a voice sample.

18. The system of claim 14, wherein the request token is an alphanumeric string and each DTMF tone corresponds to one character in the alphanumeric string.

19. The system of claim 14, wherein the telephony application is further configured to authorize the mobile device to proceed with a voice call upon receiving the request token.

20. The system of claim 14, wherein the request token uniquely identifies the database record.

21. The system of claim 14, wherein the request token is generated by encrypting a database record number of the database record using the security token.

22. The system of claim 14, wherein when checking a timestamp of the request token, the first computing device is configured to
    determine whether a database record exists that corresponds to the request token;
    compare the timestamp of the request token with a current time timestamp; and
    mark the database record as inactive if the timestamp of the request token is within a predetermined amount of time of the current time timestamp.

23. The system of claim 14, wherein when matching the ANI data, the first computing device is configured to
    receive, from the telephony application, ANI data associated with the mobile device; and
    compare the ANI data received from the telephony application with the ANI data stored in the database record.

24. The system of claim 14, wherein when validating the biometric parameters
    the telephony application is configured to capture biometric parameters for a user of the mobile device and transmit the captured biometric parameters to the first computing device; and
    the first computing device is configured to compare the captured biometric parameters with the biometric parameters stored in the database record.

25. The system of claim 14, wherein when dialing the first phone number using the dial delay value, the mobile device is configured to
    open a telephone line; and
    wait a period of time corresponding to the dial delay value before dialing the first phone number.

26. The system of claim 14, wherein the first computing device is further configured to
    generate a request key upon validation of the request token;
    transmit the request key to the telephony application, wherein the telephony application acknowledges the request key; and
    retrieve the context parameters using the request key.

* * * * *